Feb. 6, 1968    B. GRANCOIN    3,368,127
SYNCHRONIZATION CHAINS
Filed July 1, 1964    2 Sheets-Sheet 2

3,368,127
SYNCHRONIZATION CHAINS
Bernard Grancoin, Paris, France, assignor to CSF—Compagnie Generale de Telegraphie Sans Fil, a corporation of France
Filed July 1, 1964, Ser. No. 379,636
Claims priority, application France, July 5, 1963, 940,535
5 Claims. (Cl. 318—18)

ABSTRACT OF THE DISCLOSURE

A Hall effect system for various transformations of co-ordinates comprises a Hall effect apparatus with a rotor and a stator having four Hall probes, arranged in two pairs. The Hall probes of each pair are in perpendicular relationship and respectively parallel to the probes of the other pair and the rotor comprises a permanent magnet with two polar pieces. The probes of each pair are fed in series with currents respectively analogous to the $x$ and $y$ coordinates of a point in a first system of axis. An adding and a subtracting device, having each two inputs and an output, have their inputs respectively connected to the outputs of one Hall probe of each pair.

In the U.S. Patent No. 3,309,642 issued March 14, 1967, a description was given of Hall effect apparatus possessing a rotor and a stator, in which at least one Hall probe is inserted, the latter delivering an alternating voltage at an amplitude proportional to the sine or cosine of the angular position of the rotor.

The present invention has for object the association of adding or subtracting devices with such apparatus possessing at least two mutually perpendicular Hall effect probes, one delivering a voltage proportional to the sine of the rotor's angular position $\theta$, and the other proportional to the cosine of this angle, so as to form weighted sums, with predetermined weighting factors, of these sines and cosines.

Figure 1:
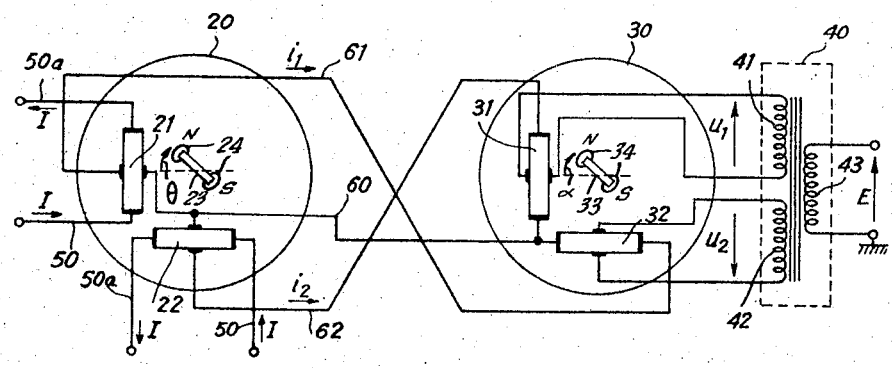
Figure 2:
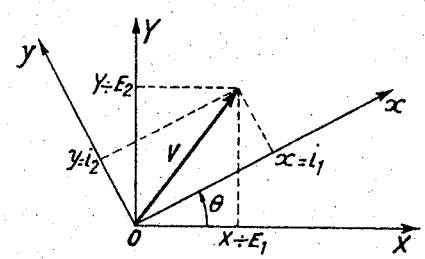
Figure 3:
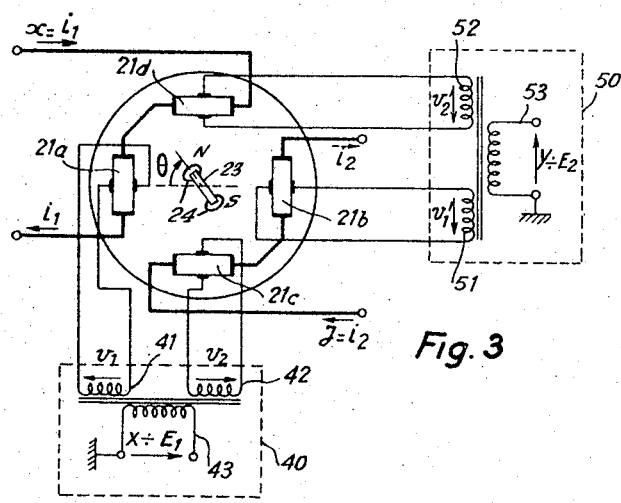
Figure 4:
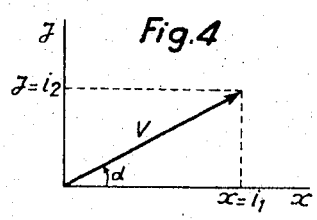
Figure 5:
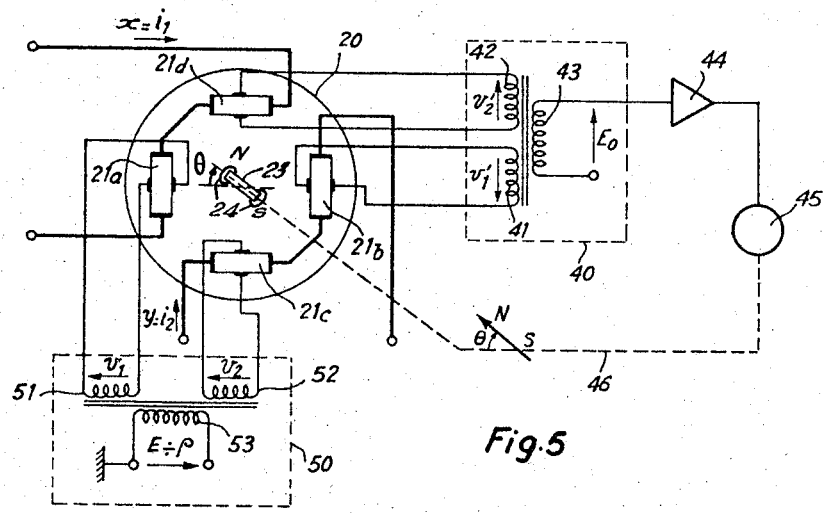

The invention will be better understood by means of the following description with reference to the appended drawings, in which:

FIG. 1 is a first example of realization;
FIG. 2 is an explanatory diagram;
FIG. 3 is a second example of realization;
FIG. 4 is an explanatory diagram;
FIG. 5 is a third example of realization.

FIG. 1 represents a synchronizing chain consisting of a transmitter 20 and a synchrodetector 30. These two devices are of the type described in the above-quoted patent and more particularly in FIGS. 7 and 8. They are identical. Transmitter 20 possesses two mutually perpendicular probes 21 and 22, inserted in the same stator, not shown and a rotor comprising a permanent magnet 23 with two polar pieces 24. These two probes are fed with the same current I, which may be a D.C. current or an alternating current, by means of connections 50.

Similarly, synchrodetector 30 possesses two mutually perpendicular probes, 31 parallel to 21, 32 parallel to 22 and a rotor comprising a permanent magnet 33 with two polar pieces 34.

The output electrodes of probe 21 are connected in such a way as to feed probe 32; similarly, the output electrodes of 22 feed probe 31. The output electrodes of 31 and 32 feed respectively the two primaries 41 and 42 of a subtracting transformer 40, the two primaries 41 and 42 being wound in opposition; the output voltage is collected at the terminals of transformer secondary 43. The subtracting transformer 40 may be replaced by a differential amplifier, especially for DC operation.

The description given in the above-quoted patent makes the mode of operation of the system of FIG. 1 easily understood.

Let $\theta$ and $\alpha$ be the respective angular positions of the rotors of arrangements 20 and 30.

These output voltages from electrodes 21 and 22 are respectively:

$$V_1 = I \cos \theta$$
$$V_2 = I \sin \theta$$

As a result, the output voltages of electrodes 32 and 31 are:

$$V_1 = I \cos \theta \sin \alpha$$
$$V_2 = I \sin \theta \cos \alpha$$

Under these conditions the output voltages of transformer 40 will be:

$$E = I (\cos \theta . \sin \alpha - \sin \theta . \cos \alpha)$$
$$= I \sin (\theta - \alpha)$$

E will be zero for $\theta = \alpha$.

In the above, no account was taken of the various proportionality factors introduced by the several probes.

Further, it will be seen that the gradient $dE/d\alpha$, which can be written $dE/d\alpha = I \cos (\alpha - \theta)$, tends to the constant value I, for all values of $\theta$, when $\theta$ is fixed and $\alpha$ tends to $\theta$.

The second example of realization, FIG. 3, has for object an arrangement including four Hall probes and a single rotor which permits solving the following problem:

A vector being defined in a system of axes Ox and Oy by two alternating voltages or currents $x$ and $y$ of given value, it is required to calculate the alternating voltages X and Y representing the same vector in a new system OX and OY making an angle $\theta$ with the former and in the same plane.

FIG. 3 shows the equations of the trigonometrical transformation which has to be performed:

$$X = x \cos \theta - y \sin \theta$$
$$Y = x \sin \theta + y \cos \theta$$

This operation can be carried out by means of a Hall effect resolver with four airgaps, each including one Hall probe.

A resolver 20 of the type described in the abovementioned patent, for example in FIGS. 10 and 11, possesses two parallel probes 21a and 21b and two probes perpendicular to the former two, 21c and 21d.

Let $\theta$ be the angular position of the rotor which comprises a permanent magnet 23 with two polar pieces 24.

The rotor is so set up, that probes 21a and 21b deliver voltages proportional to $\cos \theta$, probes 21c and 21d delivering voltages proportional to $\sin \theta$.

Probe 21a and probe 21d are fed in series with the alternating current $i_1$, which is the analogue of $x$. Similarly, probes 21c and 21b are fed in series with current $i_2$ which is the analogue of $y$.

Outputs of 21a and 21c are respectively connected to the terminals of the two primaries 41 and 42 of a subtracting transformer (primary windings wound in opposite directions) 40, whose secondary delivers the voltage $E_1$ analogue of X.

Similarly, outputs of 21b and 21d respectively feed primary windings 51 and 52 of an adding transformer 50, whose secondary delivers the voltage $E_2$ analogue of Y.

Then, apart from the transformation ratios:

$$X = x \cos \theta - y \sin \theta$$
$$Y = x \sin \theta + y \cos \theta$$

The subtracting and adding transformers (40 and 50) may be replaced by a differential and a summing amplifier, especially for direct current operation.

The diagram of FIG. 5, derived from that of FIG. 3, permits solving the following problem: the coordinates $x$ and $y$ of a point being known, to compute the polar coordinates $\rho$ and $\alpha$.

FIG. 4 shows the calculation corresponding to this transformation:

$$x = \rho \cos \alpha$$
$$y = \rho \sin \alpha$$

where $$|\vec{V}| = \rho = \sqrt{x^2 + y^2}$$

This operation can be carried out by means of a Hall effect resolver with four airgaps, as in the preceding example.

A resolver 20, consisting of the same elements as in FIG. 3 and fed with voltages $x$ and $y$ as in FIG. 3, has its Hall electrodes of probes 21a and 21c respectively connected to the primaries 51 and 52 of an adding transformer 50, while the Hall electrodes of probles 21b and 21d are respectively connected to the primaries 41 and 42 of a subtracting transformer 40.

The output of differential transformer 40 is connected to the control terminal of a motor 45, through a control amplifier 44.

A mechanical link 46 couples motor 45 to the rotor of resolver 20.

Let E be the voltage collected at the terminals of secondary 53 of adding transformer 50.

Then:

$$E = k (x \cos \theta + y \sin \theta)$$

where $\theta$ is the angle made by the rotor with the electrical zero, and $k$ is a constant.

Replacing $x$ by $\rho \cos \alpha$ and $y$ by $\rho \sin \alpha$, we have:

$$E = k\rho \cos (\theta - \alpha)$$

which makes $E = k\rho$, when $\theta = \alpha$.

Let $E_0$ be the error voltage collected at the terminals of secondary 43 of differential transformer 40.

Then:

$$E_0 = k_0 \rho \sin (\theta - \alpha)$$

This error voltage is substantially proportional to the difference $\theta - \alpha$ which is to be made equal to zero. Zero value is obtained when the angle $\theta$ set up by the rotor of resolver 20, is equal to the given angle $\alpha$, in other words, when the angular position of the rotor shows the angle $\alpha$ which it is proposed to calculate.

Further, when $\theta = \alpha$, the voltage E, as stated above, is proportional to the modulus $\rho$ which is to be calculated.

As in previous applications the substracting and adding transformers (40 and 50) may be replaced by a differential and a summing amplifier.

What is claimed is:

1. A synchrodetection chain, comprising: a first and a second Hall effect apparatus, respectively comprising a stator, two Hall probes in said stator, having respective inputs and outputs, and being in perpendicular relationship, and a rotor rotatably mounted in said stator and comprising a permanent magnet with two polar pieces having respective bounding cylindrical surfaces, the axis of which are parallel and in symmertical relationship with respect to the axis of rotation of said rotor, for generating a magnetic field in said stator; means for feeding in series a control current to said inputs of said two Hall probes of said first apparatus; means for respectively connecting the output of one Hall probe of said first apparatus to the input of one Hall probe of said second apparatus; a subtracting cell having two inputs respectively connected to the two outputs of the Hall probes of said second apparatus and one output.

2. A synchrodetection chain, comprising: a first and a second Hall effect apparatus, respectively comprising a stator, two Hall probes in said stator, having respective inputs and outputs and being in perpendicular relationships, and a rotor rotatably mounted in said stator, comprising a permanent magnet with two polar pieces having respective bounding cylindrical surfaces, the axis of which are parallel and in symmetrical relationship, with respect to the axis of rotation of said rotor, for generating a magnetic field in said stator, means for feeding in series a control alternating current to said inputs of said two Hall probes of said first apparatus; means for respectively connecting the outputs of one Hall probe of said first apparatus to the input of one Hall probe of said second apparatus; a subtracting transformer having two input windings respectively connected to the two outputs of the Hall probes of said second apparatus and one output winding, for feeding an output error voltage.

3. A Hall effect system comprising: a Hall effect apparatus comprising a stator, four Hall probes in said stator, arranged for forming a first and a second pair, the probes of each pair being in perpendicular relationship, the probes of the first pair being respectively parallel to the probes of the second pair, said probes having respective inputs and outputs, and a rotor rotatably mounted in said stator, comprising a permanent magnet with two polar pieces having respective bounding surfaces, the axes of which are parallel and in symmertical relationship with respect to the axis of rotation of said rotor, for generating a magnetic field in said stator; means for feeding in series respectively control current to the inputs of said Hall probes of said first pair and to the inputs of said Hall probes of said second pair; a first and a second transformer having two respective inputs and respective outputs, said inputs being respectively connected to the outputs of the probes of said first and second pairs.

4. A Hall effect system comprising: a Hall effect apparatus comprising a stator, four Hall probes in said stator, arranged for forming a first and a second pair, the probes of each pair being in perpendicular relationship, the probes of the first pair being respectively parallel to the probes of the second pair, said probes having respective inputs and outputs, and a rotor rotatably mounted in said stator, comprising a permanent magnet with with two polar pieces having respective bounding cylindrical surfaces, the axis of which are parallel and in symmetrical relationship with respect to the axis of rotation of said rotor, for generating a magnetic field in said stator; means for feeding in series respectively control currents to the inputs of said Hall probes of said first pair and to the inputs of said Hall probes of the second pair, respectively analogous to the coordinates $x$, $y$ of a point with respect to first reference axes; a first adding and a second subtracting transformer having first and second respective inputs and respective first and second output, said inputs being respectively connected to the outputs of the probes of said first and second pairs, said outputs delivering voltages respectively analogous to the coordinates $x$ and $y$ with respect to second reference axes.

5. A Hall effect system comprising: a Hall effect apparatus comprising a stator, four Hall probes in said stator, arranged for forming a first and a second pair, the probes of each pair being in perpendicular relationship, the probes of the first pair being respectively parallel to the probes of the second pair, said probes having respective inputs and outputs, and a rotor rotatably mounted in said stator, comprising a permanent magnet with two polar pieces having respective bounding cylindrical surfaces, the axis of which are parallel and in symmetrical relationship with respect to the axis of rotation of said rotor, for generating a magnetic field in said stator; means for feeding in series respectively control currents to the inputs of said Hall probes of said first pair and the inputs of said Hall probes of said second pair, respectively analogous to the coordinates $x, y$ of a point with respect to two first reference axes; a first adding and a second subtracting transformer having first and second respective inputs and respective first and second outputs, said inputs being respectively connected to the outputs of the probes of said first and second pairs; said first transformer having one output for delivering a voltage proportional to the modulus of the polar coordinates of the point; said second transformer delivering a control voltage; a motor being fed by said control voltage and having an output shaft for rotating said rotor; means being provided for displaying the equilibrium position of said rotor.

References Cited

UNITED STATES PATENTS

| | | | |
|---|---|---|---|
| 2,536,805 | 1/1951 | Hansen | 340—315 XR |
| 2,648,834 | 8/1953 | Lohse et al. | 340—315 XR |
| 2,697,808 | 12/1954 | MacNichol | 318—28 |
| 3,309,642 | 3/1967 | Grancoin | 338—32 |
| 2,872,112 | 2/1959 | Greenwood | 318—20.375 |
| 3,159,777 | 12/1964 | Manteuffel | 318—254 X |
| 3,210,631 | 10/1965 | Niccolls | 318—138 |

BENJAMIN DOBECK, *Primary Examiner.*